UNITED STATES PATENT OFFICE.

HANS GOLDSCHMIDT, OF ESSEN-ON-THE-RUHR, GERMANY, ASSIGNOR TO THE FIRM OF TH. GOLDSCHMIDT, OF ESSEN-ON-THE-RUHR, GERMANY.

THERMIC MIXTURE.

No. 902,871.   Specification of Letters Patent.   Patented Nov. 3, 1908.

Application filed February 14, 1906. Serial No. 301,096.

*To all whom it may concern:*

Be it known that I, HANS GOLDSCHMIDT, a subject of the King of Prussia, German Emperor, and resident of Essen-on-the-Ruhr, Province of the Rhine, German Empire, have invented certain new and useful Improvements in Thermic Mixtures, of which the following is an exact specification.

The well known mixture of aluminum and an oxid of a metal is used for thermic purposes, as for example for heating purposes, heating and welding metals, especially rails, tubes, and so on; it is furthermore used for manufacturing metals, as for example chromium or manganese, molybdenum, ferro-titanium, and so on. In all these cases the oxid of the metal, which is employed, is brought in an intimate contact and mixed with an active metal as aluminum; by igniting the mixture composed of these two substances a reduction of the metal compound is obtained, so that a fluid alumina - slag is formed and the metal, which was contained in the compound, is separated in form of a fluid regulus. This process is known under the name of the "Goldschmidt" thermic process and the essential feature of this process was that when carrying out the reaction there is no external heating of the mixture and the reaction is automatically transferred from one part of the mixture to the adjacent parts.

Hitherto the active metal in the Goldschmidt-mixture was always aluminum or magnesium or a mixture of both the metals, to which an oxid of a metal or a sulfate of a metal or a halogen of a metal is added.

Now it has been found, and this is the object of my invention, that I can use with great advantage the metal silicon in combination with the metal magnesium or an alloy of these two metals in various proportions as a substitute for the active metals hitherto used.

It has been already tried to mix aluminum with silicon and to use it as an active metal in the well-known Goldschmidt-process, but the reaction is not very active, especially when large proportions of silicon are employed, and therefore it was suggested that the mixture of magnesium with silicon might have the same result. But the trials made in this direction have shown that a very active reaction takes place, if I mix for example in weight 15 per cent. granulated magnesium with 10 per cent. granulated silicon and add to this mixture a portion of 75 per cent. in weight of iron-oxid-protoxid; then a liquid slag, approximately to the formula:

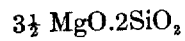

$3\frac{1}{2}$ MgO.2SiO$_2$ and liquid iron is obtained; the iron is obtained about quantitatively in form of a molten regulus being highly superheated. The spreading of the reaction is also very fast, which makes this reaction especially adapted for welding purposes. In the same manner such a mixture is adapted for all other thermic processes, which are known as Goldschmidt thermic processes, as for example for the manufacture of chromium, manganese, molybdenum and so on. Naturally I can also take the oxid or sulfids or sulfates, nitrates or halogens of the metal which I will obtain.

I will give an example of such a mixture: I take a mixture or an alloy of equal parts of magnesium and silicon and add the equivalent parts of chromium oxid, that means about 12 per cent. of magnesium, 12 per cent. of silicon and about 76 per cent. of oxid of chromium. All these substances are finely granulated and then intimately mixed with each other. To this I can add fluxes, as lime, fluor-spar, and so on or I can add other metals which are molten down when the reaction takes place. I will give an example of forming such an alloy by adding other metals to the reaction mixture. For example when manufacturing an alloy of manganese and copper I mix equivalent parts of an oxid of manganese with magnesium and silicon in equivalent parts as described before in manufacturing chromium, and add to this mixture copper; then the heat will melt down the copper, and I get a regulus of an alloy of manganese and copper. In the same manner other alloys may be manufactured.

It is clear that for the purpose of manufacturing an alloy I can reduce in the same manner the oxids of two different metals in one operation.

It is obvious that the substances taking part in the reaction must all be granulated and intimately mixed as already well known by the Goldschmidt process.

The substitution of a mixture or an alloy of magnesium with silicon for aluminum is of special value for melting down metallic iron for welding purposes; I give hereinafter several examples which show that I may vary the proportions of the substances in such active mixtures. A special good mixture contains 50 parts of "magnesium thermit" and 50 parts of "silicon thermit". The "magnesium thermit" designates a mixture of approximately equivalent parts of magnesium and oxid of iron or protoxid-oxid of iron; the words "silicon thermit" designate an approximately equivalent mixture of silicon and oxid or protoxid of iron. This expression and designation of the word "thermit" is already known by the old Goldschmidt process. This mixture contains about 15 per cent. of magnesium 10 per cent. of silicon and about 75 per cent. iron oxid protoxid. In the following other mixtures shall be described especially for protoxid-oxid of iron, but this protoxid oxid of iron can also be replaced by other metallic compounds, especially metallic oxids.

30 Mg and 70 Si thermit= 9% Mg and 18% Si and 77% $Fe_3O_4$.
40 Mg and 60 Si thermit=12% Mg and 12% Si and 76% $Fe_3O_4$.
50 Mg and 50 Si thermit=15% Mg and 10% Si and 75% $Fe_3O_4$.
60 Mg and 40 Si thermit=18% Mg and 8% Si and 74% $Fe_3O_4$.
70 Mg and 30 Si thermit=21% Mg and 6% Si and 73% $Fe_3O_4$.

As an essential feature of my improved mixture must be cited that the silicon of the mixture can be thoroughly oxidized, if a certain surplus of an oxidizing agent is employed, such as iron-oxid, and that the metal can be obtained practically free from silicon and magnesium in a reguline state. The presence of small quantities of magnesium is sufficient to bring the silicon to a full reducing action. Even if I reduce the quantity of magnesium more than given in the first formula above cited, the reaction takes place in a complete manner. It is also obvious, that in combination with magnesium and silicon also other reducing agents can be simultaneously used, such as aluminum, calcium, barium, strontium, sodium and the like. All these metals can also be used in the form of an alloy.

It is not necessary to use the silicon or magnesium in a pure state, especially the silicon can be taken in the form of a silicon alloy, especially as a high-grade ferro-silicon. In this case the iron of the ferro-silicon is molten down together with the metal to be reduced.

Having thus fully described the nature of my invention, what I desire to secure by Letters Patent of the United States is:—

1. A thermic mixture having in combination with a metal compound reducible to a metal a mixture containing 40–75% of magnesium and 60–25% of silicon.

2. A thermic mixture having in combination with a metal compound reducible to a metal an alloy containing 40–75% of magnesium and 60–25% of silicon.

3. A thermic mixture having in combination with a metal compound containing only metal and oxygen and reducible to a metal a mixture containing in granulated form 40–75% of magnesium and 60–25% of silicon.

4. A thermic mixture having in combination with a metal compound containing only metal and oxygen and reducible to a metal an alloy containing in granulated form 40–75% of magnesium and 60–25% of silicon.

5. A thermic mixture having in combination with an iron compound consisting of iron and oxygen a mixture containing 40–75% of magnesium and 60–25% of silicon.

6. A thermic mixture having in combination with an iron compound consisting of iron and oxygen an alloy containing 40–75% of magnesium and 60–25% of silicon.

7. A thermic mixture having in combination with iron-oxid protoxid ($Fe_3O_4$) a mixture containing 40–75% of magnesium and 60–25% of silicon.

8. A thermic mixture having in combination with iron oxid-protoxid ($Fe_3O_4$) an alloy containing 40–75% of magnesium and 60–25% of silicon.

9. A thermic mixture consisting in proportion of about 15 parts in weight of magnesium, 10 parts in weight of silicon and 75 parts in weight of iron-oxid-protoxid ($Fe_3O_4$) thoroughly mixed.

10. A thermic mixture consisting in proportions of about 15 parts in weight of magnesium, 10 parts in weight of silicon, both metals forming an alloy and of 75 parts in weight of iron-oxid-protoxid ($Fe_3O_4$) thoroughly mixed.

In witness whereof I have hereunto set my hand in the presence of two witnesses.

HANS GOLDSCHMIDT.

Witnesses:
WOLDEMAR HAUPT,
HENRY HASPER.